(12) United States Patent
Shimada

(10) Patent No.: US 9,052,415 B2
(45) Date of Patent: Jun. 9, 2015

(54) MAGNETO-OPTICAL CERAMIC MATERIAL AND METHOD FOR SELECTING SAME

(75) Inventor: Tadakatsu Shimada, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 63 days.

(21) Appl. No.: 14/005,101

(22) PCT Filed: Mar. 15, 2012

(86) PCT No.: PCT/JP2012/056630
§ 371 (c)(1),
(2), (4) Date: Sep. 13, 2013

(87) PCT Pub. No.: WO2012/124753
PCT Pub. Date: Sep. 20, 2012

(65) Prior Publication Data
US 2014/0001424 A1    Jan. 2, 2014

(30) Foreign Application Priority Data
Mar. 16, 2011    (JP) .................................. 2011-057783

(51) Int. Cl.
*C09K 9/00*    (2006.01)
*G02F 1/00*    (2006.01)
(Continued)

(52) U.S. Cl.
CPC . *G02B 1/00* (2013.01); *C04B 35/50* (2013.01); *C04B 35/505* (2013.01);
(Continued)

(58) Field of Classification Search
USPC .................... 252/583, 62.51 R, 62.51, 301.4; 359/484.03, 796; 451/28, 57; 501/94, 501/152; 423/263
See application file for complete search history.

(56) References Cited

U.S. PATENT DOCUMENTS 5,013,696 A    5/1991    Greskovich et al.
5,781,299 A *  7/1998    Womack et al. .............. 356/507
(Continued)

FOREIGN PATENT DOCUMENTS

JP    05-330913 A    12/1993
JP    8-5960 A    1/1996
(Continued)

OTHER PUBLICATIONS

Edited by Ken'ya Hamano, Fine Ceramics Handbook, Asakura Publishing Co., Ltd., Feb. 10, 1984, pp. 391-392.
(Continued)

*Primary Examiner* — Bijan Ahvazi
(74) *Attorney, Agent, or Firm* — Westerman, Hattori, Daniels & Adrian, LLP

(57) ABSTRACT

The present invention relates to a magneto-optical ceramic material which is characterized by being configured of an oxide ceramic that is mainly composed of an oxide that is represented by formula (1): $(Tb_xRe_{1-x})_2O_3$ (wherein Re represents at least one element that is selected from among scandium, yttrium, lanthanum, europium, gadolinium, ytterbium, holmium and lutetium, and $0.4 \leq x \leq 1.0$). The magneto-optical ceramic material is also characterized in that the difference between the refractive index at the grain boundary and the refractive index of the main phase of the oxide ceramic crystal at 25° C. is 0.004 or less. The present invention is capable of reliably providing a magneto-optical ceramic material for Faraday rotators of optical isolators and the like, said magneto-optical ceramic material having good polarization state and large extinction ratio, and enables size reduction of an optical isolator that is used for fiber laser for processing machines.

4 Claims, 2 Drawing Sheets

(51) Int. Cl.
*G02B 1/00* (2006.01)
*C04B 35/50* (2006.01)
*C04B 35/505* (2006.01)
*C04B 35/645* (2006.01)
*C01F 17/00* (2006.01)
*G02B 27/28* (2006.01)
*G02B 9/00* (2006.01)

(52) U.S. Cl.
CPC .... *C04B 35/6455* (2013.01); *C04B 2235/3224* (2013.01); *C04B 2235/3225* (2013.01); *C04B 2235/3227* (2013.01); *C04B 2235/3232* (2013.01); *C04B 2235/3244* (2013.01); *C04B 2235/604* (2013.01); *C04B 2235/85* (2013.01); *C04B 2235/9653* (2013.01); *C01F 17/0043* (2013.01); *C01P 2002/50* (2013.01); *C01P 2006/60* (2013.01)

(56) References Cited

U.S. PATENT DOCUMENTS

| | | | |
|---|---|---|---|
| 6,825,144 | B2 | 11/2004 | Hideki et al. |
| 2002/0179989 | A1* | 12/2002 | Tatoh et al. .................. 257/434 |
| 2008/0094734 | A1* | 4/2008 | Zimmer et al. ............... 359/796 |
| 2009/0081100 | A1* | 3/2009 | Suzuki et al. ................. 423/263 |
| 2011/0133111 | A1* | 6/2011 | Makikawa et al. .... 252/62.51 R |
| 2012/0236409 | A1* | 9/2012 | Yahagi et al. ............ 359/484.03 |

FOREIGN PATENT DOCUMENTS

| | | |
|---|---|---|
| JP | 2638669 B2 | 8/1997 |
| JP | 2007-277034 A | 10/2007 |
| JP | 4033451 B2 | 1/2008 |
| JP | 2010-285299 A | 12/2010 |
| JP | 2011-121837 A | 6/2011 |
| WO | 2006/106745 A1 | 10/2006 |
| WO | 2012/046755 A1 | 4/2012 |

OTHER PUBLICATIONS

International Search Report dated Jun. 5, 2012, issued in corresponding application No. PCT/JP2012/056630.

International Preliminary Report on Patentability and Written Opinion dated Sep. 26, 2013, issued in corresponding application No. PCT/JP2012/056630, with forms PCT/IB/338; PCT/IB/373; PCT/ISA/237 (7 pages).

* cited by examiner

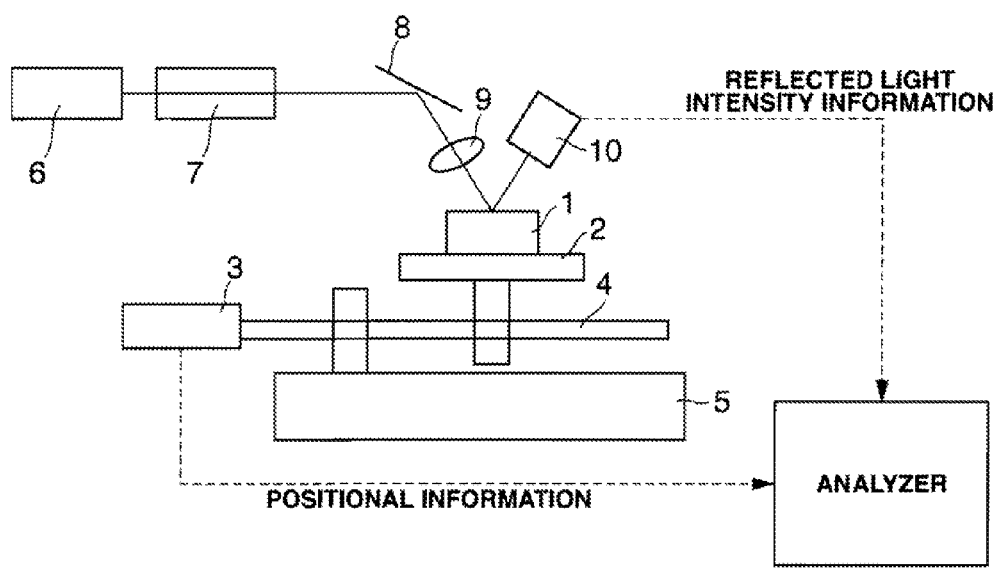
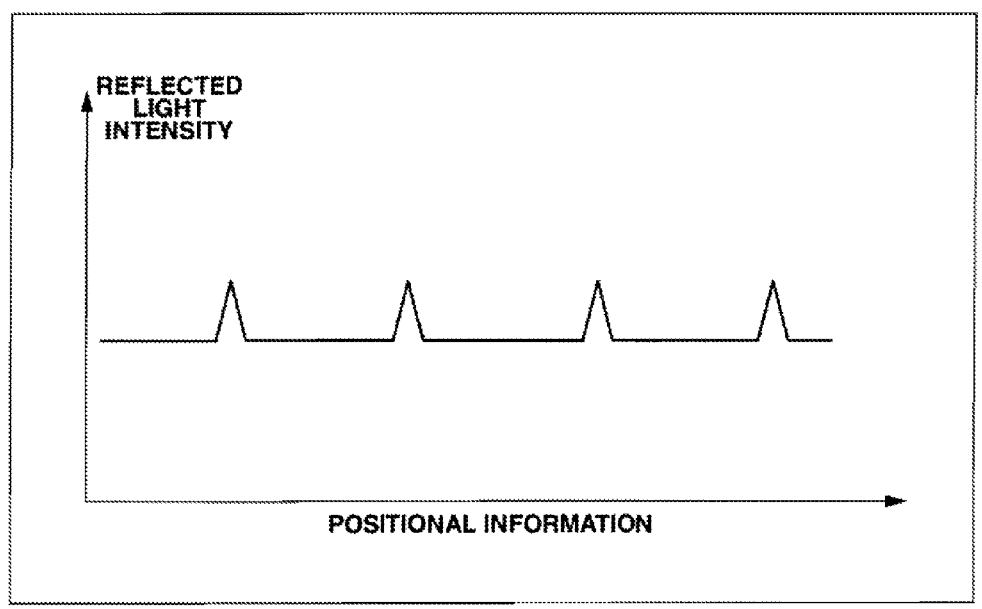

MAGNETO-OPTICAL CERAMIC MATERIAL AND METHOD FOR SELECTING SAME

TECHNICAL FIELD

This invention relates to a magneto-optical ceramic material for use in the construction of magneto-optical devices (for example, Faraday rotators) in optical isolators, and a method for selecting the same.

BACKGROUND ART

With the advance of laser processing machines, magneto-optical devices utilizing the interaction of light and magnetism have recently become of much interest. One of these devices is an isolator, which functions to inhibit the phenomenon that if the light oscillated from a laser source is reflected by the optical system in its path and is returned to the light source, then it disturbs the light oscillated from the laser source, to cause an unstable oscillation state. Accordingly, on use, the optical isolator is arranged between a laser source and an optical member so as to take advantage of the function.

The optical isolator comprises three parts, a Faraday rotator, a polarizer arranged on the light-input side of the Faraday rotator, and an analyzer arranged on the light-output side of the Faraday rotator. The optical isolator utilizes the nature, commonly known as the Faraday effect, that when light enters the Faraday rotator under the condition where a magnetic field is applied to the Faraday rotator in a direction parallel to the light traveling direction, the plane of polarization is rotated in the Faraday rotator. Specifically, the light of the incident light having the same plane of polarization as that of the polarizer is transmitted by the polarizer and enters the Faraday rotator. The light is rotated by +45 degrees relative to the light traveling direction in the Faraday rotator, and then emerges therefrom.

By contrast, when the return light entering the Faraday rotator in an opposite direction to the incident direction first passes through the analyzer, only a component of the light having the same plane of polarization as that of the analyzer is transmitted by the analyzer and enters the Faraday rotator. In the Faraday rotator, the plane of polarization of the return light is further rotated by +45 degrees in addition to the initial +45 degrees. Since the plane of polarization of the return light is at a right angle of +90 degrees with respect to the polarizer, the return light is not transmitted by the polarizer.

It is necessary that the material to be used for the Faraday rotator of the optical isolator mentioned above have a significant Faraday effect and a high transmittance at the wavelength at which it is used.

Also, if a polarized component different from the incident light is generated in the output light, this different polarized component is transmitted by the polarizer, indicating insufficient blockage of the return light.

For the evaluation of the generation of the different polarized component, polarized light of 0 to 90 degrees enters a material used as the Faraday rotator, output light is transmitted by the polarizer into a photodetector, and the intensity of light is measured by the photodetector. From the maximum intensity (Imax) and minimum intensity (Imin), an extinction ratio (S) is computed according to the following equation.

$$S = -10 \log(I_{min}/I_{max}) \text{(unit: dB)}$$

While higher values of extinction ratio are desirable, an extinction ratio of at least 30 dB is generally required.

JP-A 2010-285299 discloses a single crystal oxide of $(Tb_xRe_{1-x})_2O_3$ (wherein $0.4 \le x \le 1.0$) and transparent oxide ceramics as the material having a high Verdet constant.

As compared with the single crystal oxide, the transparent oxide ceramics are inexpensive and industrially promising because the reaction temperature can be kept low so that large-scale production in a simple plant is possible.

In JP 4033451, for example, a rare earth oxide of the general formula: $R_2O_3$ wherein R is a rare earth element is free of birefringence since its crystal structure is cubic. It is described that a sintered body having a high degree of transparency can be produced if pores and impurity segregates are completely removed.

Also, JP-A H05-330913 discloses that addition of sintering aids is effective for removing pores. Further, JP 2638669 discloses removal of pores by hot isostatic pressing and re-sintering.

On the other hand, if heat treatment in the presence of sintering aids is continued for a long time, the sintering aids or the like segregates at grain boundaries. Sometimes, a difference arises between the refractive index of the main phase of crystal grains and the refractive index at the grain boundary.

If there is a difference in refractive index between the main phase and the grain boundary as mentioned above, the polarization state of transmitted light is changed, specifically the extinction ratio becomes lower. An optical isolator manufactured using such material has a poor degree of optical separation.

SUMMARY OF INVENTION

Technical Problem

An object of the invention is to provide a magneto-optical ceramic material having a satisfactory polarization state and a high extinction ratio, and a method for selecting the same.

Solution to Problem

The inventors made extensive investigations to overcome the above problem. In connection with the process of preparing a ceramic material by using the oxide of terbium which is a paramagnetic element with a high Verdet constant and an oxide of rare earth element (scandium, yttrium, lanthanum, europium, gadolinium, ytterbium, holmium or lutetium) as main components, adding one or more sintering aids thereto, mixing, molding, calcining, sintering in vacuum, HIP treating, and annealing, ceramic materials were prepared while the conditions of each step including time, temperature and atmosphere were changed. Examining the relationship of the difference in refractive index between main phase and grain boundary of the resulting ceramic particles to the extinction ratio, the inventors have found that a highly homogeneous ceramic material substantially free of segregation of sintering aids at the grain boundary and having an improved extinction ratio is obtained if the difference in refractive index is less than 0.004.

Accordingly, the invention provides a magneto-optical ceramic material and a method of selection, as defined below.

[1] A magneto-optical ceramic material comprising an oxide ceramic material based on an oxide having the formula (1):

$$(Tb_xRe_{1-x})_2O_3 \qquad (1)$$

wherein Re is at least one element selected from the group consisting of scandium, yttrium, lanthanum, europium, gadolinium, ytterbium, holmium and lutetium, and $0.4 \le x \le 1.0$, wherein the difference between the refractive index at the grain boundary and the refractive index of the main phase of the oxide ceramic crystal at 25° C. is not more than 0.004.

[2] The magneto-optical ceramic material of [1], for use in optical isolator Faraday rotators.

[3] A method for selecting a magneto-optical ceramic material having a high extinction ratio, comprising the step of selecting an oxide ceramic material wherein the difference between the refractive index at the grain boundary and the refractive index of the main phase of the oxide ceramic crystal at 25° C. is not more than 0.004, from oxide ceramic materials based on an oxide having the formula (1):

$(Tb_xRe_{1-x})_2O_3$ (1)

wherein Re is at least one element selected from the group consisting of scandium, yttrium, lanthanum, europium, gadolinium, ytterbium, holmium and lutetium, and 0.4×1.0.

[4] The method of [3] wherein the magneto-optical ceramic material is for use in optical isolator Faraday rotators.

Advantageous Effects of Invention

The invention ensures to provide a magneto-optical ceramic material having a satisfactory polarization state and high extinction ratio, suited for use in optical isolator Faraday rotators or the like, and to manufacture an optical isolator of compact size for use in a fiber laser of a processing machine.

BRIEF DESCRIPTION OF DRAWINGS

FIG. 1 schematically illustrates a system for measuring the refractive index of grain boundary and main phase.

FIG. 2 is a schematic diagram showing one exemplary relationship of positional information to reflected light intensity.

DESCRIPTION OF EMBODIMENTS

Figure 3:
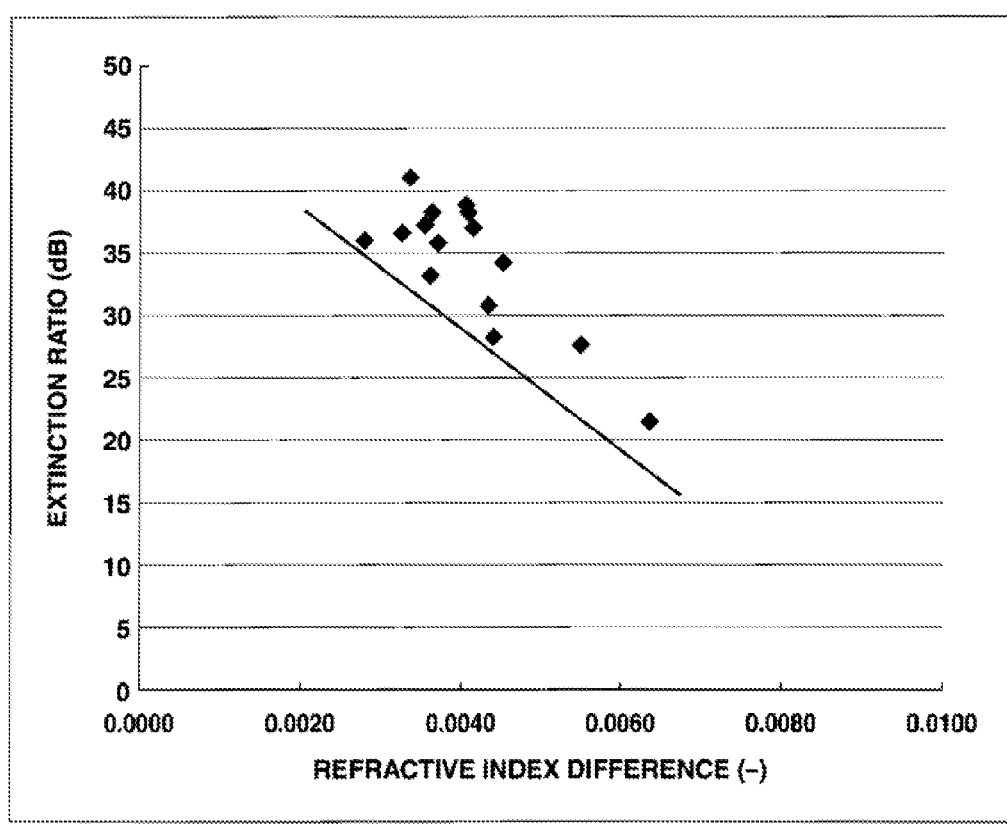
FIG. 3 is a graph showing extinction ratio versus refractive index difference.

The magneto-optical ceramic material for use in an optical isolator Faraday rotator according to the invention is defined as comprising an oxide ceramic material based on an oxide having the formula (1):

$(Tb_xRe_{1-x})_2O_3$ (1)

wherein Re is at least one element selected from the group consisting of scandium, yttrium, lanthanum, europium, gadolinium, ytterbium, holmium and lutetium, and 0.4×1.0, the oxide ceramic material preferably having a Verdet constant of at least 0.18 min/Oe-cm at wavelength 1.065 μm wherein the difference between the refractive index at the grain boundary and the refractive index of the main phase of the oxide ceramic crystal at 25° C. is not more than 0.004, and preferably the extinction ratio is at least 25 dB, more preferably at least 30 dB, and most preferably at least 35 dB. In formula (1), x is at least 0.4, preferably 0.5 to 0.9, and more preferably 0.5 to 0.7. Re is selected from the above-listed elements, with Y and Gd being preferred.

The oxide ceramic material contains an oxide, fluoride, nitride or another compound of titanium, zirconium, hafnium, calcium or the like as sintering aid and may optionally contain 0.0001 to 0.01 part by weight of an alkaline earth metal oxide such as magnesium oxide, strontium oxide or barium oxide per 100 parts by weight of the oxide of formula (1).

The oxide ceramic material may generally be prepared by the method described in JP-A 2010-285299, specifically by providing the oxide of terbium which is a paramagnetic element with a high Verdet constant and an oxide of rare earth element (scandium, yttrium, lanthanum, europium, gadolinium, ytterbium, holmium or lutetium) as main components, adding thereto one or more sintering aids, for example, the sintering aids disclosed in JP-A H05-330913, specifically an oxide, fluoride, nitride or another compound of titanium, zirconium, hafnium, calcium or the like, mixing, molding, calcining, sintering in vacuum, and HIP treating according to the procedure commonly used in the prior art.

In the practice of the invention, of the oxide ceramic materials thus obtained, those in which the difference between the refractive index at the grain boundary and the refractive index of the main phase of the oxide ceramic crystal is not more than 0.004 are selected and adopted as the homogeneous material having a high extinction ratio.

Based on the principle that the intensity of reflected light varies with refractive index, the difference in refractive index between the grain boundary and the main phase may be determined by the following method shown in FIG. 1.

Once a ceramic material (or sample) 1 in test at its end faces is polished to mirror finish, it is rested on a moving stage 2. The stage 2 is attached to a ball screw 4 coupled to a motor 3 so that the stage 2 is movable. A pedestal is depicted at 5.

Measurement light from a light source 6 is directed to the sample 1 obliquely from above. The measurement light is expanded in a beam expander 7, reflected by a mirror 8, and directed to the sample 1 via an objective lens 9, whereby measurement of a microscopic spot is possible. As the measurement wavelength becomes shorter, measurement of a finer spot is possible. A photodetector (or power meter) 10 receives the reflected light for detecting the intensity of reflected light.

While the test sample is moved, signals from the photodetector are monitored. When the refractive index changes at the grain boundary, the signal from the photodetector changes. The reflectivity R at the interface between the sample and air is expressed as $R=(n-1)^2/(n+1)^2$ wherein n is the refractive index of the sample.

Then the refractive index is determined from a change of the photodetector signal.

It is noted that FIG. 2 shows one exemplary relationship of the intensity of reflected light from the power meter to the positional information from the motor.

Since the relationship of a change of refractive index to a change of photodetector signal varies with an optical measurement system, this relationship can be corrected by attaching a material having a known refractive index to the sample, performing mirror finish polishing perpendicular to the attachment interface and measuring the sample in this state.

Also the difference in refractive index may be qualitatively evaluated by slicing the test sample and visually observing the slice under a microscope.

Separately, an approximate estimate is obtainable by a visual comparison of a test sample with the standard sample whose refractive index difference has been measured with the reflected light.

EXAMPLES

Examples are shown below by way of illustration and not by way of limitation.

A mixture was obtained by combining a terbium oxide powder and a $Y_2O_3$ or $Gd_2O_3$ powder having a different particle size in a molar ratio (40-70%:60-30%), adding 0.5 wt % of $ZrO_2$, $HfO_2$ or $TiO_2$ as sintering aid thereto, further adding effective amounts of ethyl cellulose as dispersant and polyvinyl alcohol as binder, and milling them in a pot mill. The mixture was spray dried, yielding granules having a size of several tens of micrometer. The granules were molded in a mold as primary shaping and subjected to CIP as secondary shaping into a compact. The compact was calcined in air at 400-1,000° C. and fired in a predetermined atmosphere at 1,600-1,800° C. The fired body was further subjected to HIP and optionally annealed. In this way, fifteen ceramic materials (size: diameter 6 mm, length 10 mm) were obtained. Each of the thus obtained ceramic materials was measured for a difference between the refractive index at the grain boundary and the refractive index of the main phase and an extinction ratio. The results are shown in the diagram.

It is noted that the refractive index is determined by using Ellipsometer as a refractive index meter, and measuring a Brewster's angle at 25° C. The extinction ratio is evaluated by directing polarized light of 0 degree to 90 degrees to a material to be used as a Faraday rotator, directing output light to a photodetector via a polarizer, measuring the intensity of light in the photodetector, and calculating an extinction ratio (S) according to the following equation from the maximum intensity (Imax) and minimum intensity (Imin).

$$S = -10 \log(I\text{min}/I\text{max})(\text{unit: dB})$$

The results are shown in FIG. 3.

It has been demonstrated that the extinction ratio is at least 30 dB as long as the refractive index difference is 0.004 or less. As the refractive index difference is reduced, the extinction ratio is improved.

REFERENCE SIGNS LIST 1 ceramic material (sample)
2 moving stage
3 motor
4 ball screw
5 pedestal
6 light source
7 beam expander
8 mirror
9 objective lens
10 photodetector

The invention claimed is:

1. A method for selecting a magneto-optical ceramic material having a high extinction ratio, comprising a step of selecting an oxide ceramic material wherein the difference between the refractive index at a grain boundary and the refractive index of a main phase of the oxide ceramic crystal at 25° C. is not more than 0.004 as a magneto-optical ceramic material having an extinction ratio of at least 30 dB, from oxide ceramic materials based on an oxide having the formula (1):

$$(Tb_xRe_{1-x})_2O_3 \qquad (1)$$

wherein Re is at least one element selected from the group consisting of scandium, yttrium, lanthanum, europium, gadolinium, ytterbium, holmium and lutetium, and $0.4 \leq x \leq 1.0$, wherein the oxide ceramic materials based on an oxide having the above formula (1) are prepared by using a terbium oxide and an oxide of at least one rare earth element selected from the group consisting of scandium, yttrium, lanthanum, europium, gadolinium, ytterbium, holmium and lutetium as main components, adding one or more sintering aids thereto, mixing, molding, calcining, sintering in vacuum, and hot isostatic pressing, wherein the difference between the refractive index at the grain boundary and the refractive index of the main phase of the oxide ceramic crystal at 25° C. is measured by steps of directing measurement light to a microscopic spot of the measurement surface of the oxide ceramic material via an objective lens while moving the oxide ceramic material, detecting the intensity of the reflected light corresponding to the position of the measurement surface by a photodetector continuously, and counting a change of refractive index based on a change of the photodetector signal as the difference in refractive index between the grain boundary and the main phase of the oxide ceramic crystal.

2. The method of claim 1, wherein the magneto-optical ceramic material is for use in optical isolator Faraday rotators.

3. The method of claim 1, wherein the extinction ratio is evaluated by directing polarized light of 0 degree to 90 degrees to the oxide ceramic material, directing output light to a photodetector via a polarizer, measuring the intensity of light in the photodetector, and calculating an extinction ratio (S) according to the following equation from the maximum intensity (Imax) and minimum intensity (Imin):

$$S = -10 \log(I\text{min}/I\text{max})(\text{unit: dB}).$$

4. The method of claim 1, wherein the relationship of a change of refractive index to a change of photodetector signal is pre-corrected by attaching a material having a known refractive index to the sample, performing mirror finish polishing perpendicular to the attachment interface and measuring the sample in this state.

* * * * *